US010056824B2

(12) United States Patent
Brasola

(10) Patent No.: US 10,056,824 B2
(45) Date of Patent: Aug. 21, 2018

(54) VOLTAGE SHUNT REGULATOR FOR THE PROTECTION OF AN ELECTRICAL LOAD FROM OVER-VOLTAGES AND VOLTAGE TRANSIENTS

(71) Applicant: COSTRUZIONI ELETTROMECCANICHE P. TORRESAN S.R.L., Sesto San Giovanni, Milan (IT)

(72) Inventor: Flavio Brasola, Milan (IT)

(73) Assignee: COSTRUZIONI ELETTROMECCANICHE P. TORRESAN S.R.L., Milan (IT)

( * ) Notice: Subject to any disclaimer, the term of this patent is extended or adjusted under 35 U.S.C. 154(b) by 0 days.

(21) Appl. No.: 15/566,437

(22) PCT Filed: Apr. 14, 2016

(86) PCT No.: PCT/IB2016/052129
§ 371 (c)(1),
(2) Date: Oct. 13, 2017

(87) PCT Pub. No.: WO2016/166697
PCT Pub. Date: Oct. 20, 2016

(65) Prior Publication Data
US 2018/0159320 A1 Jun. 7, 2018

(30) Foreign Application Priority Data

Apr. 15, 2015 (IT) .............................. MI2015A0543

(51) Int. Cl.
*H02M 1/32* (2007.01)
*H02H 1/00* (2006.01)
(Continued)

(52) U.S. Cl.
CPC ............ *H02M 1/32* (2013.01); *H02H 1/0007* (2013.01); *H02H 9/041* (2013.01); *G05F 1/44* (2013.01)

(58) Field of Classification Search
CPC .......... H02M 1/32; H02M 5/06; H02M 5/257; G05F 1/44; H02H 9/041; H02H 1/0007
See application file for complete search history.

(56) References Cited

U.S. PATENT DOCUMENTS 3,539,865 A * 11/1970 Billings ................. H02H 9/041
361/55
3,551,745 A * 12/1970 Nicholas ................ H02H 3/202
361/110

(Continued)

FOREIGN PATENT DOCUMENTS

EP          0462694 A2    12/1991

OTHER PUBLICATIONS

International Search Report issued for PCT/IB2016/052129, dated Oct. 24, 2016.

*Primary Examiner* — Yusef A Ahmed
(74) *Attorney, Agent, or Firm* — Arent Fox LLP

(57) ABSTRACT

A voltage shunt regulator for the protection of an electrical load from overvoltages and voltage transients of a supply voltage is provided. The electrical load is connectable to a supply voltage source by an electrical line which includes a first and a second conductive line. The shunt regulator includes a power circuit block connectable between the first and the second conductive lines in parallel to the load. The power block can be activated to limit the voltage applied to the load to a safe voltage in case of overvoltages and voltage transients, and includes a switch circuit with trigger threshold connected in series to a voltage limiting circuit. The regulator also includes a circuit block for detecting the (Continued)

supply voltage and driving the power circuit block, connectable between the supply voltage source and the power circuit block.

10 Claims, 4 Drawing Sheets

(51) Int. Cl.
*H02H 9/04* (2006.01)
*G05F 1/44* (2006.01)

(56) References Cited

U.S. PATENT DOCUMENTS

| | | | | | |
|---|---|---|---|---|---|
| 4,168,443 | A | * | 9/1979 | Periot | H03K 17/945 307/652 |
| 5,789,902 | A | * | 8/1998 | Abe | H02J 7/0031 320/134 |
| 2004/0085698 | A1 | * | 5/2004 | Ball | H02H 9/001 361/100 |
| 2006/0056205 | A1 | * | 3/2006 | Kyono | H02M 1/32 363/15 |
| 2006/0214599 | A1 | * | 9/2006 | Ogawa | H02M 1/32 315/169.4 |
| 2011/0141776 | A1 | * | 6/2011 | Lin | H02H 7/125 363/53 |
| 2013/0155561 | A1 | | 6/2013 | Lai | |
| 2014/0125130 | A1 | * | 5/2014 | Cao | H02M 5/257 307/23 |
| 2014/0254210 | A1 | * | 9/2014 | Hayasaki | G03G 15/80 363/21.12 |
| 2015/0372583 | A1 | * | 12/2015 | Bacaksiz | H02H 7/1213 363/16 |
| 2016/0308448 | A1 | * | 10/2016 | Nishijima | H02M 3/33507 |
| 2017/0141692 | A1 | * | 5/2017 | Stewart | H02M 5/293 |

* cited by examiner

VOLTAGE SHUNT REGULATOR FOR THE PROTECTION OF AN ELECTRICAL LOAD FROM OVER-VOLTAGES AND VOLTAGE TRANSIENTS

CROSS-REFERENCE TO RELATED APPLICATIONS

This application is the U.S. National Stage Application of International Patent Application No. PCT/I132016/052129, filed on Apr. 14, 2016, which claims priority to IT Application No. MI2015A000543, filed on Apr. 15, 2015, the contents of each of which is incorporated herein by reference in its entirety.

TECHNOLOGICAL BACKGROUND OF THE INVENTION

Field Of Application

The present invention generally relates to the circuits for protecting electrical loads from overvoltages generated in electrical lines. In particular, the invention relates to a voltage shunt regulator for the protection of an electrical load from overvoltages and voltage transients.

Prior Art

In an electrical line, it is known to use voltage regulators to protect an electrical load connected to the line from overvoltages.

Among the voltage regulators that can be used for these purposes, linear regulators comprise a regulation device connectable between the supply voltage source and the load to be protected, i.e. such regulators are installed in series to the electrical line. Commercially available linear regulators comprise, for example, regulators of the semiconductor, ferroresonant or switching type.

Such known linear regulators have considerable limitations.

Firstly, since all the electric power passes through the linear regulator to reach the load, such regulators installed in series to the electrical line have efficiency loss and aging phenomena due to Joule heating.

Secondly, such linear voltage regulators are not able to protect the load from voltage transients.

Thirdly, such linear voltage regulators are characterized by considerable costs, dimensions and weights.

SUMMARY OF THE INVENTION

It is the object of the present invention to devise and provide a voltage regulator, in particular a voltage shunt regulator to protect an electrical load from overvoltages and voltage transients generated in electrical lines, which allows to overcome the above limits which are typical of known voltage regulators.

Such an object is achieved by a voltage shunt regulator for the protection of an electrical load from overvoltages and voltage transients according to claim 1.

In particular, it is an object of the invention to provide a voltage regulator for the protection of an electrical load from overvoltages and voltage transients which is substantially free of distortions caused by parasitic effects and which ensures adequate protection to the electrical load both from the slow fluctuations of the line voltage and from fast voltage transients.

Preferred embodiments of such a voltage shunt regulator are described in the dependent claims.

BRIEF DESCRIPTION OF THE DRAWINGS

Further features and advantages of the voltage shunt regulator for the protection of an electrical load in an electrical line of the invention will become apparent from the following description of a preferred embodiment thereof, made by way of non-limiting example, with reference to the accompanying drawings, in which.

In the above figures, elements which are equivalent or similar will be indicated by the same reference numerals.

DETAILED DESCRIPTION

Figure 1:
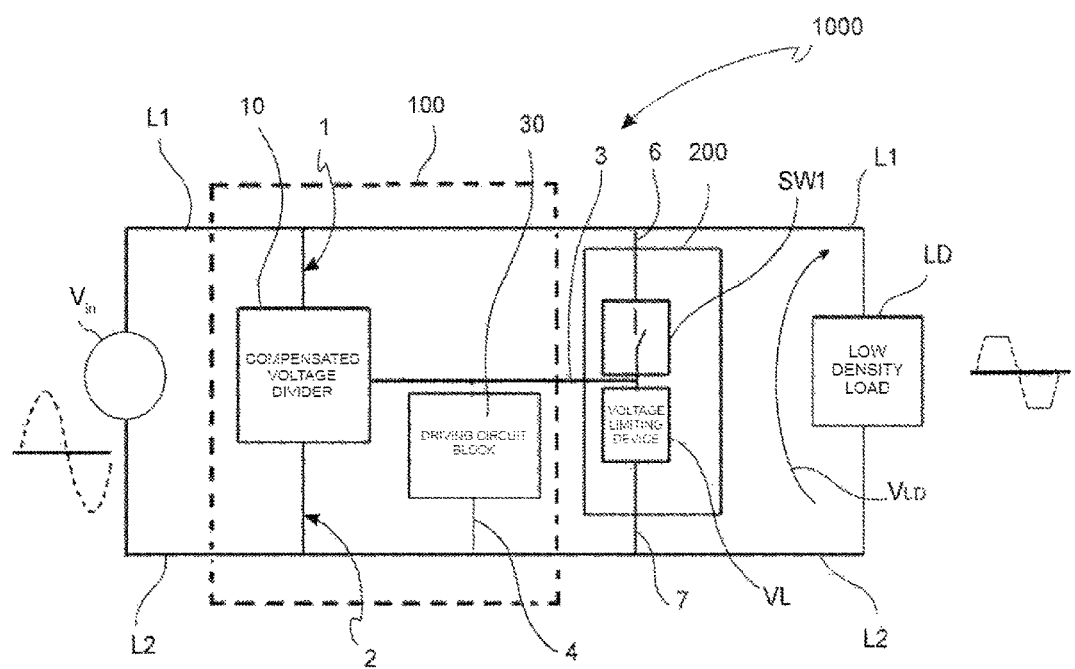
FIG. 1 shows a block diagram of a voltage shunt regulator for the protection of an electrical load connected to an electrical line according to the present invention.
Figure 2:
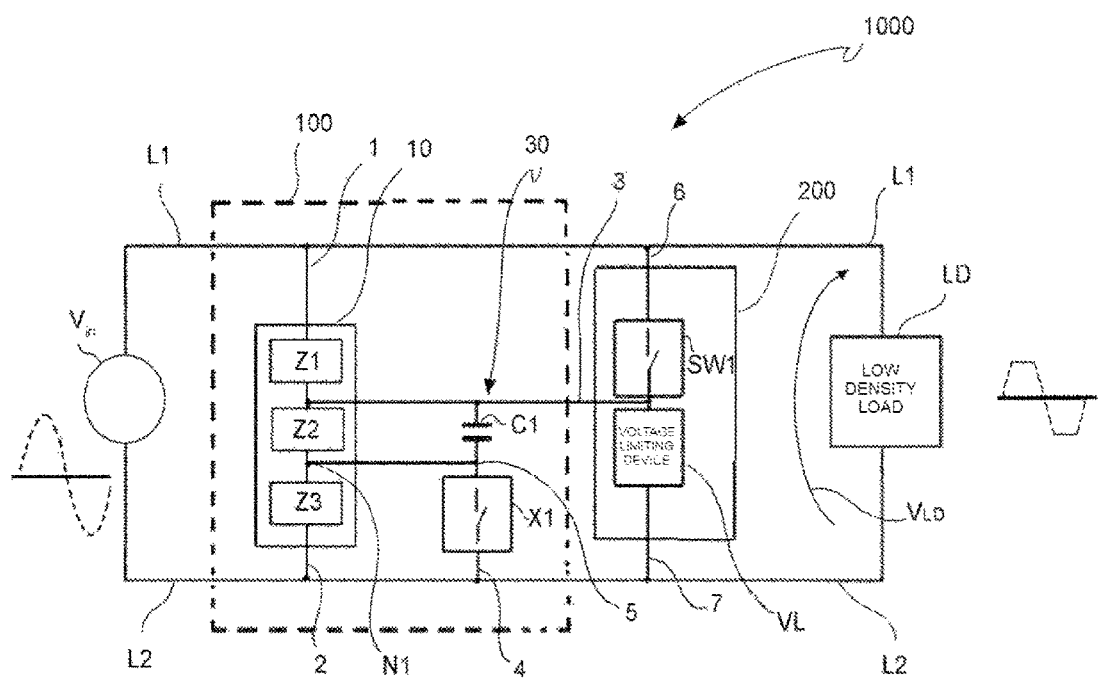
FIG. 2 shows a first embodiment of some blocks of the voltage shunt regulator in FIG. 1.
Figure 4:
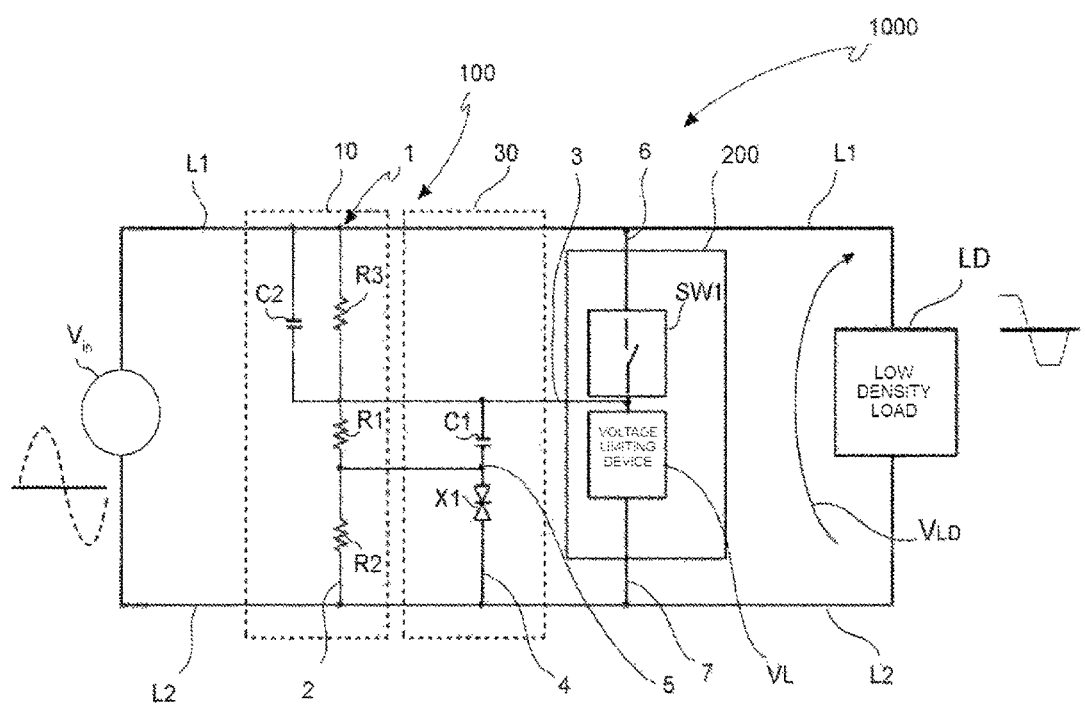
FIG. 4 shows a second embodiment of some blocks of the voltage shunt regulator in FIG. 1.

With reference to FIGS. 1, 2 and 4, a voltage shunt regulator for the protection of an electrical load LD from overvoltages or voltage transients present on an electrical line according to the invention is indicated as a whole with the reference numeral 1000.

In the following description, the voltage shunt regulator 1000 of the invention will also be referred to as a shunt regulator or simply regulator.

It is noted that the electrical load mentioned above represents a generic load connectable to a supply voltage source Vin by means of an electrical line which includes a first L1 and a second L2 conductive line. For example, the supply voltage source Vin is the 230 V mains voltage.

In the present description, the term "overvoltage" is used to indicate slow voltage fluctuations present in the line (or Voltage Swell). Such voltage fluctuations are, for example, caused by ON/OFF switching of a load and are of the order of milliseconds or seconds.

In the case of slow voltage fluctuations present on the line, the currents associated with these fluctuations, which can cross the regulator 1000, are of the order of hundreds of Amperes.

In the present description, the term "voltage transient" is used to indicate fast voltage variations, among which:
line voltage spikes, either positive or negative, for example caused by lightning strikes;
fast voltage oscillatory surges for example caused by relay switches present in the line;
positive voltage notches, for example caused by switching of thyristors.

All of these voltage transients are of the order of microseconds.

It is noted that the currents associated with lightning strikes that the regulator 1000 can withstand are of the order of tens of thousands of Amperes. The currents associated with fast oscillatory surges and notches that can cross regulator 1000 are of the order of hundreds or even thousands of Amperes.

The voltage shunt regulator 1000 of the invention comprises a power circuit block or final power block 200 connectable between the first L1 and the second L2 conductive lines of the electrical line. Therefore, in operating conditions, the power circuit block 200 of the regulator is connected in a shunt to the electrical line, i.e. it is connected in parallel to load LD.

Moreover, as will be better explained hereinafter, the power circuit block 200 of the voltage shunt regulator 1000 can be activated to limit the voltage applied to the electrical load LD, in case of overvoltages and voltage transients of the supply voltage, to a safety voltage $V_{LD}$. Such a power circuit block 200 comprises, in general, a switch circuit SW1 with threshold trigger connected in series to a voltage limiting circuit VL between the first L1 and the second L2 conductive lines of the electrical line. In particular, such a switch circuit is a power switching device SW1 with threshold trigger, such a limiting circuit is a voltage limiting device VL.

Advantageously, the voltage shunt regulator 1000 of the invention comprises a circuit block 100 for detecting the supply voltage and driving the above power circuit block 200. In particular, such a detection and driving circuit block 100 is connectable to the electrical line between the supply voltage source Vin and the power circuit block 200.

The above supply voltage detection and driving circuit block 100 is configured to activate the power circuit block 200 upon the detection of a crossing of a preset voltage threshold VT by the supply voltage. In particular, with reference to FIG. 3A, such a crossing of the voltage threshold VT, configured to activate the power circuit block 200, corresponds to a variation in the supply voltage Vin from a first voltage level V' having an absolute value lower than the absolute value of threshold VT to a second voltage level V" having an absolute value greater than the absolute value of threshold VT.

Conversely, a crossing of the voltage threshold VT by the supply voltage Vin, from a voltage level having an absolute value greater than the absolute value of threshold VT to a voltage level having an absolute value lower than the absolute value of said threshold VT is configured to deactivate the power circuit block 200 of regulator 1000.

With reference to FIG. 1, the supply voltage detection and driving circuit block 100 of the voltage regulator 1000 comprises a circuit block 10 for detecting the supply voltage connectable to the first L1 and to the second L2 conductive lines of the electrical line through a first 1 and a second 2 detection terminal, respectively.

Moreover, the detection and driving circuit block 100 comprises a command terminal 3 configured to connect the detection circuit block 10 to the power circuit block 200 of the shunt regulator 1000.

In addition, with reference to FIG. 2, the detection and driving circuit block 100 comprises a driving circuit block 30 connected to the command terminal 3. Such a driving block 30 is connectable to the second L2 conductive line of the electrical line through a third terminal 4 of the detection and driving circuit block 100.

In particular, such a driving circuit block 30 is configured to activate the power circuit block 200 upon the detection of the crossing of a preset voltage threshold VT by the supply voltage, as noted above.

As shown in FIGS. 1, 2 and 4, the regulator 1000 of the invention, which comprises as a whole the circuit block 100 for detecting the supply voltage and driving the power circuit block 200, is connected in a shunt to the electrical line.

In one embodiment of the invention, the driving circuit block 30 comprises at least one threshold switching device X1 having its own triggering voltage or a first triggering voltage $V_{TH}$ related to the above-mentioned preset voltage threshold VT of the voltage regulator 1000. Advantageously, such a threshold switching device X1 is of bidirectional type, i.e. adapted to be activated at the threshold for both positive values of the voltage applied thereto and for negative values of such a voltage.

In a more particular embodiment, such at least one threshold switching device X1 comprises the above-mentioned third terminal 4 connectable to the second conductive line L2 of the electrical line and a switching device terminal 5 operatively connected to the command terminal 3. Such a threshold switching device X1 is configured to be activated, i.e. to switch from a high impedance state (in which the device is substantially equivalent to an open circuit) to a low impedance state (in which such a device is substantially equivalent to a short-circuit), when the absolute value of the voltage applied between the third terminal 4 and the switching device terminal 5 is greater than the triggering voltage $V_{TH}$.

It is noted that the number of threshold switching devices X1 usable in the driving circuit block 30 depends on the line voltage. For example, for lines with a 230V voltage, the driving circuit block 30 comprises two threshold switching devices connected in series to each other.

For example, the threshold switching device X1 of regulator 1000 is selected from the group consisting of:
DIAC (Diode for Alternating Current),
TRISIL,
any bidirectional switching circuit made using discrete components.

With reference to FIG. 2, the driving circuit block 30 of the power circuit block 200 further comprises a first capacitor C1 connected between the command terminal 3 and the terminal 5 of the threshold switching device X1. The capacity of the first capacitor C1 is, for example, of the order of 10 nF and such a capacitor is configured to facilitate the activation of the power circuit block 200 upon the activation of the threshold switching device X1.

With reference again to FIG. 2, the circuit block for detecting the supply voltage 10 of the shunt regulator 1000 includes a compensated voltage divider. Such a compensated divider 10 comprises:
a first impedance Z1 connected between the first detection terminal 1 and the command terminal 3;
a second impedance Z2 connected between the command terminal 3 and a first node N1 of the compensated divider;
a third impedance Z3 connected between such a first node N1 and the second detection terminal 2.

Such a compensated divider 10 is configured to implement a proper division of the line voltage supplied by the supply source Vin also in the presence of transient phenomena, avoiding distortion caused by parasitic capacitances.

It is noted that the first node N1 of the compensated voltage divider 10 is directly connected to terminal 5 of the threshold switching device X1, i.e. such a threshold switching device X1 is connected in parallel to the above-mentioned third impedance Z3 of the compensated divider 10.

With reference to FIG. 4, relating to a preferred embodiment of the voltage regulator 1000 of the invention, the compensated divider 10 is a resistive divider including a compensating capacity. In particular, the first impedance Z1 of the compensated voltage divider 10 includes a first resistor R3 connected in parallel to a second capacitor C2. Such a second capacitor C2 is selected according to the power switching device SW1 with threshold trigger of the power block 200 to be driven. Such a second capacitor C2 has a capacity from about 2 nF to 50 nF, for example.

Moreover, the second impedance Z2 of the compensated voltage divider 10 includes a second resistor R1 and the third impedance Z3 of the compensated voltage divider 10 includes a third resistor R2.

It is noted that the embodiment of regulator 1000 in FIG. 4 is particularly advantageous to protect load LD from overvoltages associated also with a direct component of the supply voltage of the electrical line.

With reference to any of one of FIGS. 1, 2 and 4, the power switching device SW1 with threshold trigger of the power circuit block 200 of regulator 1000 is of bidirectional type. In particular, such a power switching device SW1 is selected, for example, from the group consisting of:
a gas discharge tube or GDT,
TRISIL,
SIDAC (Silicon Diode for Alternating Current).

With reference to the same figures, the voltage limiting device VL of the power circuit block 200 of regulator 1000 is selected, for example, from the group consisting of:
varistor or Voltage Dependent Resistor (VDR),
Zener diode,
TRANSIL.

The above-mentioned power circuit block 200 comprises a first power block terminal 6 connectable to the first conductive line L1, a second power block terminal 7 connectable to the second conductive line L2, and a third power block terminal connected to the command terminal 3.

In particular, the power switching device SW1 with threshold trigger is connected between the first power block terminal 6 and the third power block terminal 3. The voltage limiting device VL is connected between the third power block terminal 3 and the second power block terminal 7.

With reference to FIGS. 3A-3E, an operating mode of the voltage shunt regulator 1000 of the invention will be described.

Such FIGS. 3A-3E show, as a function of time, waveforms of voltages applied to the voltage regulator 1000, for example the regulator in FIG. 2, when the supply voltage supplied by source Vin to the electrical line is sinusoidal with constant frequency.

The above FIGS. 3A-3E, for simplicity, only show the positive half-waves of the waveforms of the voltages applied to regulator 1000, but similar considerations also apply to negative half-waves.

Figure 3:
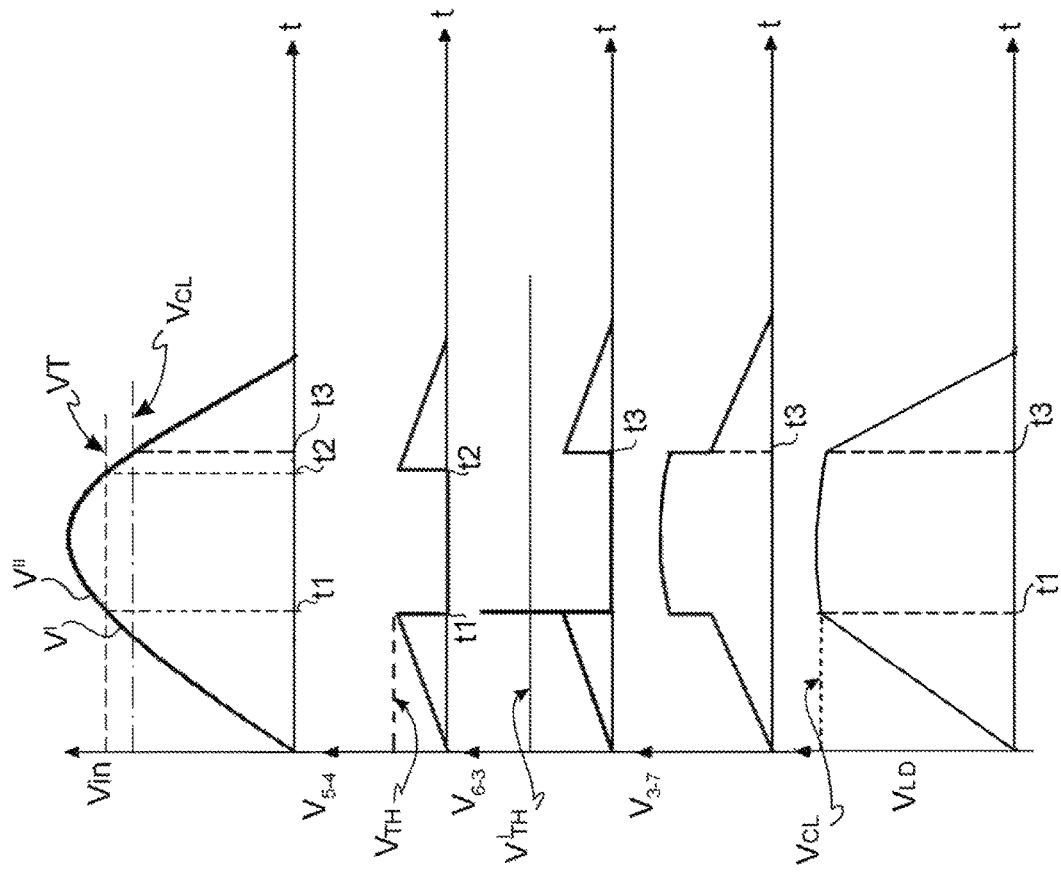
FIGS. 3A-3E show, as a function of time, voltage waveforms applied to the voltage shunt regulator in FIG. 2.

In particular:
FIG. 3A shows the waveform of the sinusoidal supply voltage Vin applied to the electrical line;
FIG. 3B shows the waveform of voltage $V_{5\text{-}4}$ applied to the threshold switching device X1, between terminals 5 and 4. $V_{TH}$ is the own triggering voltage associated with the threshold switching device X1;
FIG. 3C shows the waveform of voltage $V_{6\text{-}3}$ applied to the power switching device SW1 with threshold trigger, between terminals 6 and 3. $V'_{TH}$ is indicative of the respective triggering voltage or second triggering voltage of such a power switching device SW1;
FIG. 3D shows the waveform of voltage $V_{3\text{-}7}$ applied to the voltage limiting device VL, between terminals 3 and 7;
FIG. 3E shows the waveform of the above mentioned safety voltage $V_{LD}$ applied to the electrical load LD when the regulator 1000 of the invention is active.

In addition, FIG. 3A shows the preset voltage threshold VT of regulator 1000 that is representative of the maximum voltage not to be applied to the electrical load LD.

Moreover, again with reference to FIG. 3A, a second voltage threshold or clamping voltage $V_{CL}$ is representative of the maximum value of voltage $V_{LD}$ applied to the electrical load LD through the regulator 1000 of the invention, as shown in FIG. 3E. It is noted that, in general, the above clamping voltage $V_{CL}$ is lower than or at most equal to the preset voltage threshold VT.

Moreover, once the voltage threshold VT has been set, the triggering voltage $V_{TH}$ associated with the threshold switching device X1 can be expressed as a function of the preset threshold voltage VT by the formula:

$$V_{TH}(x1) = \frac{Z_3}{Z_1 + Z_2 + Z_3} VT \qquad (1)$$

In general, the values of the first Z1, second Z2 and third Z3 impedances of the detection circuit block 10 of the supply voltage are selected so that:
the voltage value between the command terminal 3 and the first node N1, i.e. the voltage drop on the second impedance Z2, is about 1/10 of the voltage drop on the third impedance Z3, i.e. about 1/10 of the voltage value between the first node N1 and the second detection terminal 2;
the voltage value between the first node N1 and the second detection terminal 2, i.e. the voltage drop on the third impedance Z3, is about equal to the voltage drop on the first impedance Z1, i.e. to the voltage value between the first detection terminal 1 and the command terminal 3.
Based on such a selection, the triggering voltage $V_{TH}$ of the threshold switching device X1 generally is in the range of 0.3 VT-0.5 VT.

It is further noted that, by indicating with $Vin_{MAX}$ the maximum voltage present on the line supplied by the supply voltage source Vin (which includes both the rated voltage of the line and any line tolerances), the voltage regulator 1000 is configured to satisfy the following relationship:

$$Vin\text{MAX} < V'_{TH}(SW1) < VT \qquad (2)$$

where $V'_{TH}(SW1)$ indicates the above-mentioned triggering voltage of the power switching device SW1 included in the power circuit block 200.

From an operational point of view, in the presence of an overvoltage, the supply voltage Vin crosses the preset voltage threshold VT in the regulator 1000 from the first voltage level V' lower than threshold VT to the second voltage level V' greater than threshold VT, as shown in FIG. 3A.

On the basis of the above equation (1) and as shown in FIG. 3B, such a crossing of the voltage threshold VT corresponds to exceeding the triggering voltage $V_{TH}$ of the threshold switching device X1 by voltage $V_{5\text{-}4}$ applied to such a device at a first instant t1.

In such a case, the threshold switching device X1, which under normal conditions is in the high impedance state, switches to the low impedance state. Therefore, the voltage $V_{5\text{-}4}$ applied to the threshold switching device X1 between terminals 5 and 4 substantially instantly takes the value of zero and the third impedance Z3 of the compensated divider 10 is short-circuited.

At such an event at the first instant t1, as shown in FIG. 3C, voltage $V_{6\text{-}3}$ applied to the power switching device SW1 undergoes an increase which leads it to exceed the respective triggering voltage $V'_{TH}$ of the power switching device SW1. The triggering or activation of the power switching device SW1 is facilitated by the first capacitor C1.

Once activated, the power switching device SW1 is configured to directly connect the first conductive line L1 of the electrical line to the command terminal 3 of regulator 1000, i.e. to the voltage limiting device VL. In other words, assuming that the voltage drop on the power switching device SW1 is negligible in the active state, the line voltage Vin including the overvoltage is applied to the ends of the voltage limiting device VL, i.e. the supply voltage source Vin is connected in parallel to the voltage limiting device VL. To this ends, see the waveform of voltage $V_{3-7}$ applied to the voltage limiting device VL, between terminals 3 and 7 (FIG. 3D).

Thereafter, the voltage limiting device VL is configured to release the excess energy associated with the overvoltage on the electrical line itself, limiting the safety voltage $V_{LD}$ applied to load LD to the clamping voltage value $V_{CL}$ as shown in FIG. 3E. Thereby, the regulator 1000 of the invention protects the electrical load LD from overvoltage.

At the end of the overvoltage on the line, i.e. when the supply voltage Vin crosses the preset voltage threshold VT at a second instant t2, the threshold switching device X1 is deactivated, returning to the high impedance state. The deactivation of the power switching device SW1, which returns to the high impedance state to decouple the first conductive line L1 from the voltage limiting device VL occurs when the supply voltage supplied by source Vin crosses the clamping voltage threshold $V_{CL}$ at the third instant t3. Thereby, the whole voltage regulator 1000 is deactivated.

While the above operating example makes explicit reference to an overvoltage, the regulator 1000 of the invention allows to protect the electrical load LD from voltage transients in a totally similar manner.

As can be seen, the object of the present invention is fully achieved by the voltage shunt regulator 1000 for the protection of an electrical load LD from overvoltages and voltage transients described above in its structural and functional features.

In particular, since the voltage regulator 1000 of the invention is connected in a shunt to the electrical line, such a regulator 1000 is substantially immune from aging and efficiency loss phenomena due to heating by Joule effect which affect the known regulators installed in series to the electrical line.

Moreover, it is noted that since the threshold switching device X1 is bidirectional, the regulator 1000 of the invention is adapted to operate both for positive polarity of the supply voltage Vin and for negative polarity of such a voltage.

In addition, through the circuit block 10 for detecting the line supply voltage, the regulator 1000 of the invention is adapted to substantially continuously monitoring voltage Vin on the line, reducing the activation time of the threshold switching device X1. This ensures adequate protection to the electrical load LD from both slow line voltage fluctuations and from fast voltage transients.

Since the voltage regulator 1000 of the invention is configured to activate only at overvoltages and voltage transients on the line, such a regulator 1000 has no insertion losses that serial type regulators instead have. In other words, the regulator 1000 of the invention allows to preserve the efficiency of the supply chain of load LD.

Finally, compared to known regulators, the regulator of the invention ensures reduced weights, dimensions and costs.

Those skilled in the art can make several changes, adaptations and replacements of elements with others which are functionally equivalent to the embodiments of the above-described voltage shunt regulator for the protection of an electrical load from overvoltages and voltage transients, in order to meet contingent needs, without departing from the scope of the following claims.

Each of the features described as belonging to a possible embodiment can be obtained independently of the other embodiments described.

The invention claimed is:
1. A voltage shunt regulator for the protection of an electrical load from overvoltages and voltage transients, said electrical load being connectable to a supply voltage source by means of an electrical line including first and second conductive lines, comprising:
   a power circuit block of the shunt regulator connectable between said first and second conductive lines of the electrical line in parallel to the load,
   said power circuit block comprises:
      a first terminal connectable to the first conductive line,
      a second terminal connectable to the second conductive line,
      a third terminal,
      a power switch device with a threshold trigger connected between the first terminal and the third terminal, and
   a voltage limiting device connected between the third terminal and the second terminal;
   a detection and driving circuit block for detecting the supply voltage and driving the power circuit block, connectable to the electrical line between said supply voltage source and the power circuit block, said detection and driving circuit block comprises:
      a driving circuit block connected to the third terminal of the power circuit block and connectable to said second conductive line by means of an additional terminal, said driving circuit block comprises at least one bidirectional threshold switching device having its own triggering voltage;
   a detection circuit block of the supply voltage connectable to the first and second conductive lines of the electrical line through first and second detection terminals, respectively, said supply voltage detection circuit block comprises a compensated voltage divider comprising:
      a first impedance connected between the first detection terminal and a command terminal;
      a second impedance connected between the command terminal and a first node;
      a third impedance connected between the first node and the second detection terminal;
   the command terminal being directly connected to the third terminal of the power circuit block;
   said supply voltage detection and driving circuit block being configured to activate the power circuit block upon the detection of a crossing of a preset voltage threshold by the supply voltage, from a first voltage level having an absolute value lower than an absolute value of the preset voltage threshold to a second voltage level having an absolute value greater than the absolute value of the preset voltage threshold,
   the triggering voltage of said at least one bidirectional threshold switching device being calculated by the formula:

$$V_{TH}(x1) = \frac{Z_3}{Z_1 + Z_2 + Z_3} VT$$

where VT is the preset voltage threshold, Z1, Z2 and Z3 are the first, second, and third impedances of the compensated voltage divider, upon the crossing of the preset voltage threshold, the at least one bidirectional threshold switching device switches from a high impedance state to a low impedance state to increase a voltage between said first terminal and said third terminal above a first triggering voltage $V'_{TH}$ of the power switch device with threshold trigger by activating it, the activated power switch device with threshold trigger being configured to directly connect the first conductive line to the command terminal so as to limit a voltage applied to the electrical load to a safety voltage.

2. The voltage shunt regulator according to claim 1, wherein said at least one bidirectional threshold switching device comprises said additional terminal connectable to the second conductive line of the electrical line, and a switching device terminal operatively connected to the command terminal, said at least one bidirectional threshold switching device being configured to switch from the high impedance state to the low impedance state when the absolute value of the voltage applied between the additional terminal and the switching device terminal is higher than the triggering voltage.

3. The voltage shunt regulator according to claim 2, where said driving circuit block comprises a first capacitor connected between said command terminal and said switching device terminal, the first node of the compensated voltage divider is directly connected to the switching device terminal to connect the at least one bidirectional threshold switching device in parallel to the third impedance.

4. The voltage shunt regulator according to claim 1, wherein by indicating $Vin_{MAX}$ as the maximum voltage present on the line supplied by the supply voltage source, the voltage regulator is configured to satisfy the relationship:

$$Vin_{MAX} < V'_{TH}(SW1) < VT$$

where $V'_{TH}(SW1)$ is said first triggering voltage of the power switch device with threshold trigger, VT is the preset voltage threshold.

5. The voltage shunt regulator according to claim 1, wherein said at least one bidirectional threshold switching device is selected from the group consisting of: a Diode for Alternating Current (DIAC) device, a thyristor surge protection device (TRISIL), and any bidirectional switching circuit made using discrete components.

6. The voltage shunt regulator according to claim 1, wherein: said first impedance of the compensated voltage divider includes a first resistor connected in parallel to a second capacitor; said second impedance of the compensated voltage divider includes a second resistor; or said third impedance of the compensated voltage divider includes a third resistor.

7. The voltage shunt regulator according to claim 1, wherein said power switch device with threshold trigger is of bidirectional type and selected from the group consisting of: a gas discharge tube (GDT), a thyristor surge protection device (TRISIL), and a Silicon Diode for Alternating Current (SIDAC).

8. The voltage shunt regulator according to claim 1, wherein said voltage limiting device is selected from the group consisting of: a varistor or Voltage Dependent Resistor (VDR), a Zener diode, and a transient-voltage-suppression diode (TRANSIT).

9. The voltage shunt regulator according to claim 1, wherein the values of said first, second and third impedances of the compensated voltage divider are such that:

the voltage value between the command terminal and the first node is about 1/10 of the voltage value between the first node and the second detection terminal; or the voltage value between the first node and the second detection terminal is about equal to the voltage value between the first detection terminal and the command terminal.

10. The voltage shunt regulator according to claim 9, wherein the triggering voltage of the at least one bidirectional threshold switching device is in the range of 0.3VT-0.5VT, where VT is the preset voltage threshold.

* * * * *